United States Patent
Long et al.

(10) Patent No.: US 11,396,892 B2
(45) Date of Patent: Jul. 26, 2022

(54) COMMON RAIL PRODUCT CIRCUIT FOR AN AGRICULTURAL APPLICATOR WITH PRESSURE ACCUMULATION CAPABILITIES AND RELATED SYSTEMS AND METHODS

(71) Applicant: CNH Industrial America LLC, New Holland, PA (US)

(72) Inventors: Scott Allen Long, Plainfield, IL (US); Nathan Brooks, Manitowoc, WI (US)

(73) Assignee: CNH Industrial America LLC, New Holland, PA (US)

( * ) Notice: Subject to any disclaimer, the term of this patent is extended or adjusted under 35 U.S.C. 154(b) by 134 days.

(21) Appl. No.: 16/826,701

(22) Filed: Mar. 23, 2020

(65) Prior Publication Data
US 2021/0293256 A1  Sep. 23, 2021

(51) Int. Cl.
*F15B 1/033* (2006.01)
*A01M 7/00* (2006.01)

(52) U.S. Cl.
CPC ........... *F15B 1/033* (2013.01); *A01M 7/0042* (2013.01); *A01M 7/0071* (2013.01); *F15B 2201/51* (2013.01)

(58) Field of Classification Search
CPC ... A01M 7/0042; A01M 7/0071; F15B 1/027; F15B 2211/212; F15B 1/033
See application file for complete search history.

(56) References Cited

U.S. PATENT DOCUMENTS

| | | | |
|---|---|---|---|
| 4,637,547 A * | 1/1987 | Hiniker | B05B 12/00 239/1 |
| 5,035,357 A * | 7/1991 | Brickell | A01M 7/0089 239/156 |
| 5,971,294 A | 10/1999 | Thompson et al. | |
| 6,749,128 B1 | 6/2004 | Oosterman | |
| 8,523,085 B2 | 9/2013 | Grimm et al. | |
| 9,504,212 B2 * | 11/2016 | Michael | A01G 25/16 |
| 9,635,848 B2 | 5/2017 | Needham et al. | |
| 10,076,088 B2 | 9/2018 | Schmidt | |

(Continued)

FOREIGN PATENT DOCUMENTS

WO  WO2018203067 A1  11/2018

*Primary Examiner* — Abiy Teka
(74) *Attorney, Agent, or Firm* — Rebecca L. Henkel; Rickard K. DeMille (57) ABSTRACT

A product application system for an agricultural applicator includes a boom assembly including a plurality of boom sections, with each boom section being pivotably coupled to at least one adjacent boom section. The system also includes a common rail product circuit spanning across a length of the boom assembly, a product pump configured to supply an agricultural product through the common rail product circuit, and a plurality of nozzle assemblies provided in association with each of the boom sections. Each nozzle assembly across the plurality of boom sections is individually coupled to the common rail product circuit. In addition, the system includes at least one pressure accumulator provided in fluid communication with the common rail product circuit, with the pressure accumulator(s) being configured to adjust a circuit pressure of the agricultural product within the common rail product circuit in response to pressure deviations from a predetermined pressure range.

20 Claims, 4 Drawing Sheets

(56) References Cited

U.S. PATENT DOCUMENTS

| | | |
|---|---|---|
| 10,173,236 B2 | 1/2019 | Preheim et al. |
| 2008/0230624 A1 | 9/2008 | Giles et al. |
| 2018/0042215 A1* | 2/2018 | Proharam ........... A01M 7/0092 |
| 2018/0043384 A1 | 2/2018 | Grimm et al. |
| 2018/0319500 A1 | 11/2018 | Grimm et al. |
| 2019/0029170 A1 | 1/2019 | Wilger |

* cited by examiner

COMMON RAIL PRODUCT CIRCUIT FOR AN AGRICULTURAL APPLICATOR WITH PRESSURE ACCUMULATION CAPABILITIES AND RELATED SYSTEMS AND METHODS

FIELD OF THE INVENTION

The present disclosure relates generally to agricultural applicators, such as agricultural sprayers and, more particularly, to a common rail product circuit for an agricultural applicator that incorporates or is otherwise associated with one or more pressure accumulators to facilitate maintaining a constant or substantially constant pressure within the product circuit. In addition, the present subject matter is related to product application systems and related methods that utilize a common rail product circuit and an associated pressure accumulator(s).

BACKGROUND OF THE INVENTION

Various types of work vehicles utilize applicators (e.g., sprayers, floaters, etc.) to deliver an agricultural product to a ground surface of a field. The agricultural product may be in the form of a solution or mixture, with a carrier (such as water) being mixed with one or more active ingredients, such as a pesticide(s) (e.g., an herbicide(s), insecticide(s), rodenticide(s), etc.) and/or a nutrient(s).

The applicators may be pulled as an implement or self-propelled, and can include a tank, a pump, a boom assembly, and a plurality of nozzle assemblies carried by the boom assembly at spaced apart locations. The boom assembly typically includes a pair of boom arms, with each boom arm extending to either side of the applicator when in an unfolded state. Each boom arm, in turn, includes multiple boom sections, with each boom section being associated with a number of nozzle assemblies. Each nozzle assembly typically includes a spray nozzle and an associated nozzle valve to regulate the output of the spray nozzle. With such configurations, a product pump is configured to supply an agricultural product through a pump line to individual boom section lines coupled in parallel to the pump line, with each boom section line being coupled in parallel to the respective spray nozzles of such boom section to allow the agricultural product to be supplied to each individual spray nozzle.

With today's product control systems, the valves associated with the various spray nozzles are controlled (e.g., via Pulse Width Modulation (PWM) of the valve control signals) to attempt to achieve a constant spray pressure, while the product pump is controlled to attempt to provide a desired product flow rate through the product circuit. However, when the ground speed of the applicator varies, the product pump is often incapable of responding quickly enough, which results in various in the boom pressure across one or more of the boom sections. For instance, sudden increases in the vehicle speed will often result in areas of lower pressure within the boom assembly, while sudden decreases in the vehicle speed will often result in areas of higher pressure within the boom assembly. Such variations in the boom pressure can significantly impact the spray quality achieved during a spraying operation, such as by resulting in undesirable variations in the droplet sizes and/or spray patterns from the nozzle assemblies.

Accordingly, an improved product circuit and related systems and methods that allow for a more consistent boom pressure to be maintained within the product circuit during variations in applicator operation would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a product application system for an agricultural applicator. The system comprises a boom assembly including a plurality of boom sections, with each of the boom sections being pivotably coupled to at least one adjacent boom section of the boom sections. The system also includes a common rail product circuit spanning across a length of the boom assembly, a product pump configured to supply an agricultural product through the common rail product circuit, and a plurality of nozzle assemblies provided in association with each of the boom sections. Each nozzle assembly across the plurality of boom sections is individually coupled to the common rail product circuit. In addition, the system includes at least one pressure accumulator provided in fluid communication with the common rail product circuit, with the at least one pressure accumulator being configured to adjust a circuit pressure of the agricultural product within the common rail product circuit in response to pressure deviations from a predetermined pressure range.

In another aspect, the present subject matter is directed to a method for operating an agricultural applicator. The agricultural applicator comprises a boom assembly including a plurality of boom sections and a common rail product circuit spanning across a length of the boom assembly. The agricultural applicator further comprises a plurality of nozzle assemblies provided in association with each of the plurality of boom sections, with each nozzle assembly across the plurality of boom sections being individually coupled to the common rail product circuit. The method includes controlling an operation of a product pump to supply agricultural product through the common rail product circuit to the plurality of nozzle assemblies at a circuit pressure within a predetermined pressure range, and controlling an operation of a nozzle valve of each nozzle assembly of the plurality of nozzle assemblies to regulate a flow rate of the agricultural product through each nozzle assembly. Additionally, when the circuit pressure of the agricultural product within common rail product circuit deviates from the predetermined pressure range, the method includes adjusting the circuit pressure in response to the pressure deviation by receiving agricultural product within or expelling agricultural product from at least one pressure accumulator provided in fluid communication with the common rail product circuit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to product application systems and related methods for an agricultural applicator. Specifically, in several embodiments, the disclosed system may include a common rail product circuit through which an agricultural product is pumped for delivery to a plurality of nozzle assemblies of the applicator. For example, the product circuit may define a common rail or supply line to which each individually nozzle assembly is fluidly coupled. In such an embodiment, a product pump of the disclosed system may be controlled to maintain the circuit pressure of the agricultural product supplied through the common rail product circuit within a predetermined pressure range, while nozzle valves of the various nozzle assemblies may be individually controlled to achieve a desired flow rate through each respective nozzle assembly.

Moreover, in accordance with aspects of the present subject matter, the disclosed system may also include one or more pressure accumulators provided in fluid communication with the common rail product circuit. In general, the pressure accumulator(s) may function to prevent or minimize temporary pressure fluctuations within the product circuit due to changes in the operating parameters of the system and/or the applicator, such as in response to pressure variations deriving from flow rate adjustments made to accommodate changes in the ground speed of the applicator. For instance, in one embodiment, the pressure accumulator(s) may be configured to release pressurized agricultural product into the common rail product circuit when the circuit pressure within the product circuit decrease below a desired pressure range and receive pressurized agricultural product from the common rail product circuit for storage therein when the circuit pressure within the product circuit increases above the desired pressure range. As a result, the pressure accumulator(s) may assist in maintaining a constant or generally constant pressure within the common rail product circuit, thereby leading to consistent spray quality even during transient events in which the operational parameters of the system and/or applicator are varying.

It should be appreciated that, although the common rail product circuit and associated pressure accumulators are generally described herein with reference to a sprayer, the present subject matter may also be advantageously utilizes with various other agricultural applicators, including, for example, seeders, planters, strip-till fertilizer applicators, and other applicators from which liquid fertilizer products are dispensed.

Figure 1:
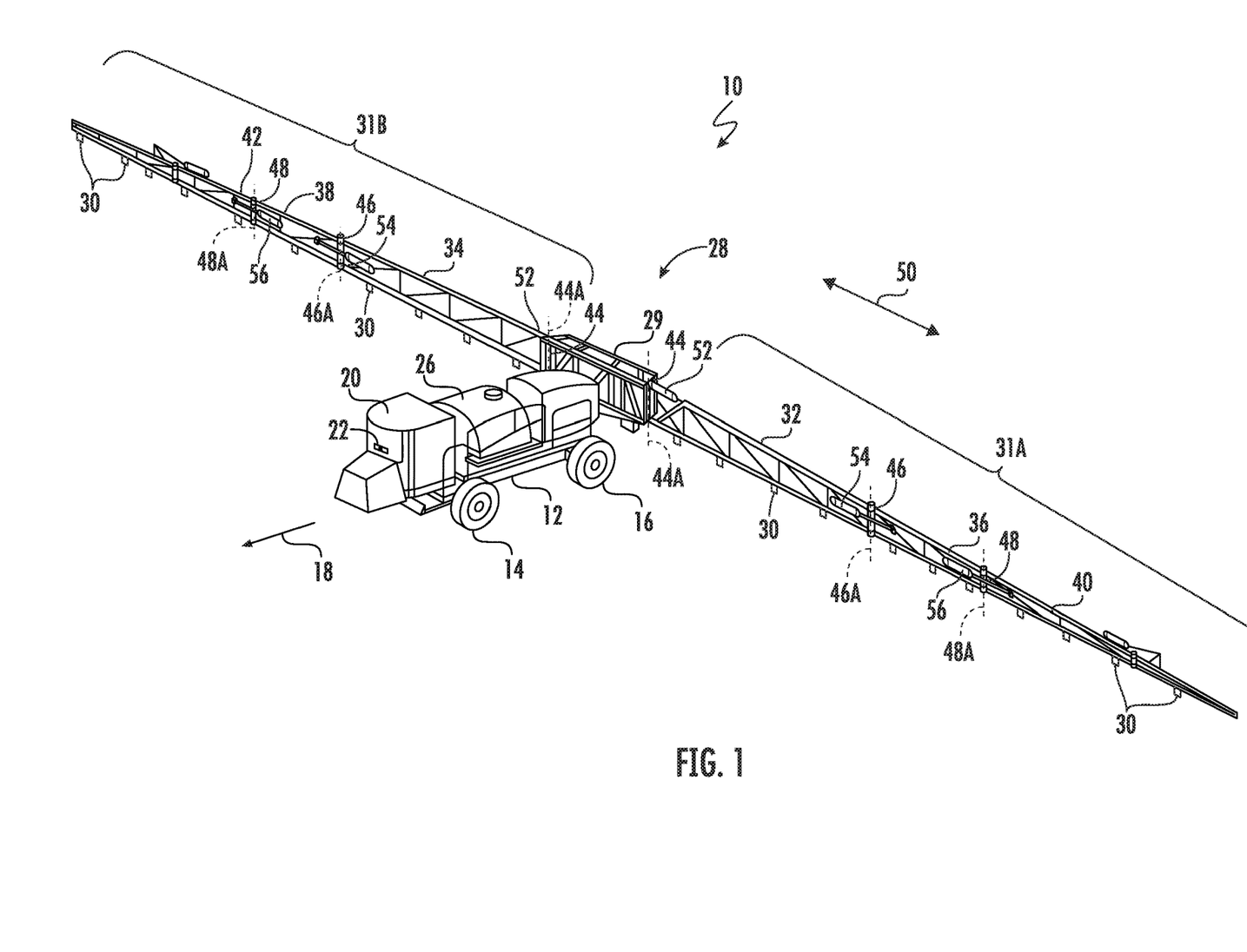
FIG. 1 illustrates a perspective view of one embodiment of an agricultural applicator in accordance with aspects of the present subject matter.
Figure 2:
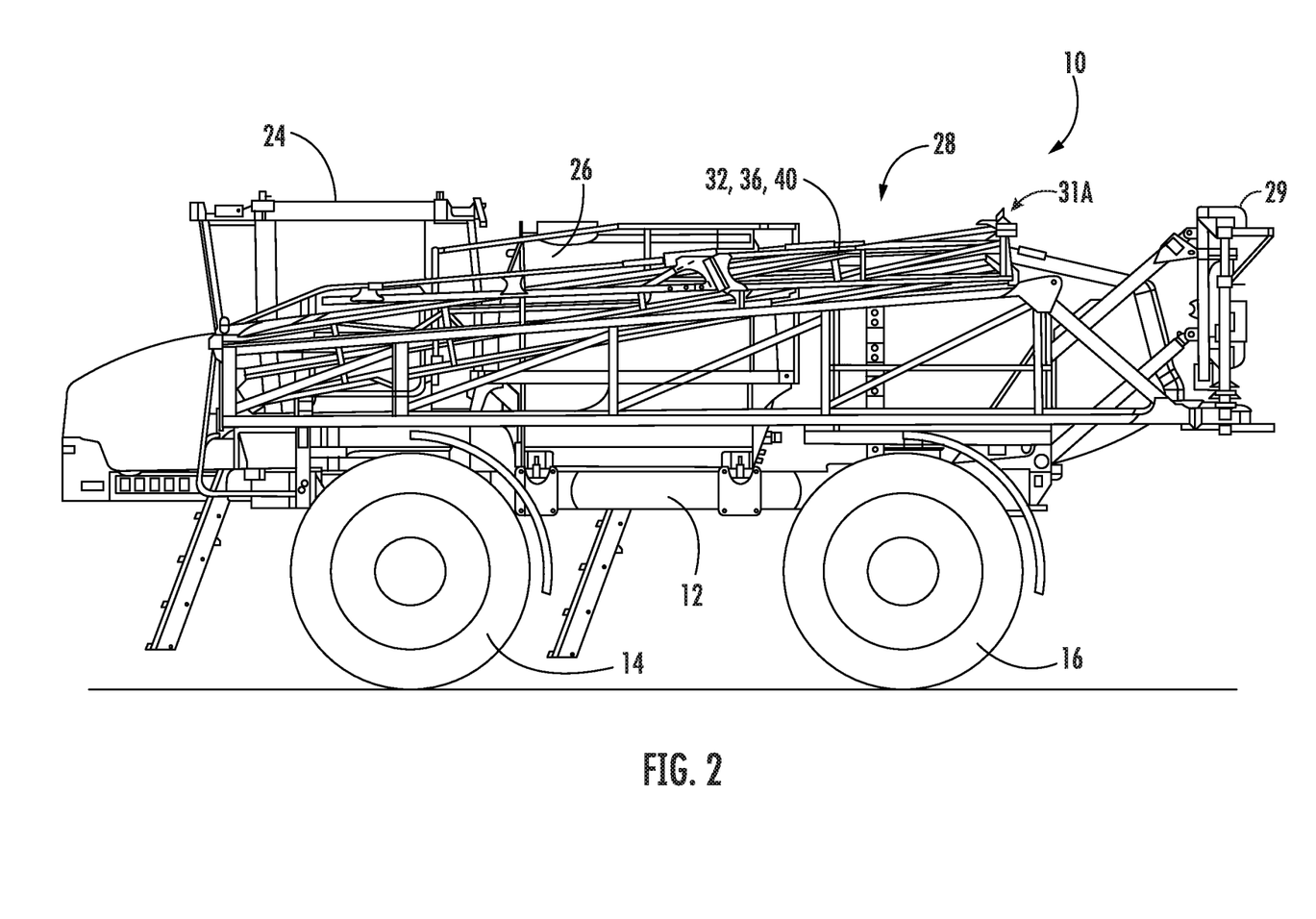
FIG. 2 illustrates a side view of the applicator shown in FIG. 1 in accordance with aspects of the present subject matter, particularly illustrating the applicator in a transport position.

Referring now to FIGS. 1 and 2, differing views of one embodiment of an agricultural applicator are illustrated in accordance with aspects of the present subject matter. Specifically, FIG. 1 illustrates a perspective view of the applicator with its boom assembly in a working or unfolded position, and FIG. 2 illustrates a side view of the applicator with its boom assembly in a transport or folded position. In the illustrated embodiment, the agricultural applicator is configured as a self-propelled agricultural sprayer 10. However, in alternative embodiments, the agricultural applicator may be configured as any other suitable type of agricultural applicator configured to perform agricultural spraying or other product application operations, such as a tractor or other work vehicle configured to haul or tow an applicator implement.

As shown in FIG. 1, the agricultural sprayer 10 may include a chassis or frame 12 configured to support or couple to a plurality of components. For example, a pair of steerable front wheels 14 (one is shown) and a pair of driven rear wheels 16 (one is shown) may be coupled to the frame 12. The wheels 14, 16 may be configured to support the agricultural sprayer 10 relative to the ground and move the agricultural sprayer 10 in a direction of travel (e.g., as indicated by arrow 18 in FIG. 1) across a field. In this regard, the agricultural sprayer 10 may include an engine (not shown) and a transmission (not shown) configured to transmit power from the engine to the wheels 14, 16. However, it should be appreciated that, in further embodiments, the front wheels 14 of the agricultural sprayer 10 may be driven in addition to or in lieu of the rear wheels 16. The frame 12 may also support an operator's cab 24 that houses various control or input devices (e.g., levers, pedals, control panels, buttons, and/or the like) for permitting an operator to control the operation of the work vehicle 10. For instance, as shown in FIG. 1, the agricultural sprayer 10 may include a user interface or human-machine interface (HMI) 22 for displaying messages and/or alerts to the operator and/or for allowing the operator to interface with the vehicle's controller through one or more user input devices (e.g., levers, pedals, control panels, buttons, and/or the like) within the cab 24 and/or in any other practicable location.

Furthermore, the frame 12 may also support one or more tanks, such as a product tank 26 and/or a rinse tank (not shown), and a boom assembly 28. The product tank 26 is generally configured to store or hold an agricultural product, such as a pesticide(s) (e.g., an herbicide(s), insecticide(s), rodenticide(s), etc.) and/or a nutrient(s). The agricultural product is conveyed from the product tank 26 through a product circuit (not shown in FIGS. 1 and 2) including numerous plumbing components, such as interconnected pieces of tubing or conduits, for selective release onto the underlying field (e.g., plants and/or soil) via a plurality of nozzle assemblies 30 mounted on the boom assembly 28. As will be described below, each nozzle assembly 30 may include, for example, a spray nozzle and an associated nozzle valve for regulating the flow rate of the agricultural product through the nozzle (and, thus, the application rate of the nozzle assembly), thereby allowing the desired spray characteristics of the output or spray fan of agricultural product expelled from the nozzle to be achieved.

As shown in FIGS. 1 and 2, the boom assembly 28 includes a central frame or boom section 29 that supports first and second boom arms 31A, 32B, which may be orientated in a cantilevered nature. The first and second boom arms 31A, 31B are generally movable between an operative or unfolded position (FIG. 1) and an inoperative or folded position (FIG. 2). When distributing product, the first and/or second boom arm 31A, 31B extends laterally outward from the central boom section 29 to the operative position in order to cover wide swaths of the underlying ground surface, as illustrated in FIG. 1. However, to facilitate transport, each boom arm 31A, 31B of the boom assembly 28 may be independently folded forwardly or rearwardly into the inoperative position, thereby reducing the overall width of the sprayer 10, or in some examples, the overall width of a towable implement when the associated applicator is configured to be towed behind a work vehicle.

Each boom arm 31A, 31B of the boom assembly 28 may generally include one or more boom sections. For instance, in the illustrated embodiment, the first boom arm 31A includes three boom sections, namely a first inner boom section 32, a first middle boom section 36, and a first outer boom section 40, and the second boom arm 31B includes three boom sections, namely a second inner boom section 34, a second middle boom section 38, and a second outer boom section 42. In such an embodiment, the first and second inner boom sections 32, 34 may be pivotably coupled to the central boom section 29. Similarly, the first and second middle boom sections 36, 38 may be pivotably coupled to the respective first and second inner boom sections 32, 34, while the first and second outer boom sections 40, 42 may be pivotably coupled to the respective first and second middle boom sections 36, 38. For example, each of the inner boom sections 32, 34 may be pivotably coupled to the central boom section 29 at pivot joints 44. Similarly, the middle boom sections 36, 38 may be pivotably coupled to the respective inner boom sections 32, 34 at pivot joints 46, while the outer boom sections 40, 42 may be pivotably coupled to the respective middle boom sections 36, 38 at pivot joints 48.

As is generally understood, pivot joints 44, 46, 48 may be configured to allow relative pivotal motion between the adjacent boom sections of each boom arm 31A, 31B. For example, the pivot joints 44, 46, 48 may allow for articulation of the various boom sections between a fully extended or working position (e.g., as shown in FIG. 1), in which the boom sections are unfolded along a lateral direction 50 of the boom assembly 28 to allow for the performance of an agricultural spraying operation, and a transport position (FIG. 2), in which the boom sections are folded inwardly to reduce the overall width of the boom assembly 28 along the lateral direction 50. It should be appreciated that, although each boom arm 31A, 31B is shown in FIG. 1 as including three individual boom sections coupled along opposed sides of the central boom section, each boom arm 31A, 31B may generally have any suitable number of boom sections.

Additionally, as shown in FIG. 1, the boom assembly 28 may include inner fold actuators 52 coupled between the inner boom sections 32, 34 and the central boom section 29 to enable pivoting or folding between the fully-extended working position and the transport position. For example, by retracting/extending the inner fold actuators 52, the inner boom sections 32, 34 may be pivoted or folded relative to the central boom section 28 about a pivot axis 44A defined by the pivot joints 44. Moreover, the boom assembly 28 may also include middle fold actuators 54 coupled between each inner boom section 32, 34 and its adjacent middle boom section 36, 38 and outer fold actuators 56 coupled between each middle boom section 36, 38 and its adjacent outer boom section 40, 42. As such, by retracting/extending the middle and outer fold actuators 54, 56, each middle and outer boom section 36, 38, 40, 42 may be pivoted or folded relative to its respective inwardly adjacent boom section 32, 34, 36, 38 about a respective pivot axis 46A, 48A. When moving to the transport position, the boom assembly 28 and fold actuators 52, 54, 56 are typically oriented such that the pivot axes 44A, 46A, 48A are generally parallel to the vertical direction 58 and, thus, the various boom sections 32, 34, 36, 38, 40, 42 of the boom assembly 28 are configured to be folded horizontally (e.g., parallel to the lateral direction 50) about the pivot axes 44A, 46A, 48A to keep the folding height of the boom assembly 28 as low as possible for transport. However, the pivot axes 44A, 46A, 48A may be oriented along any other suitable direction.

Figure 3:
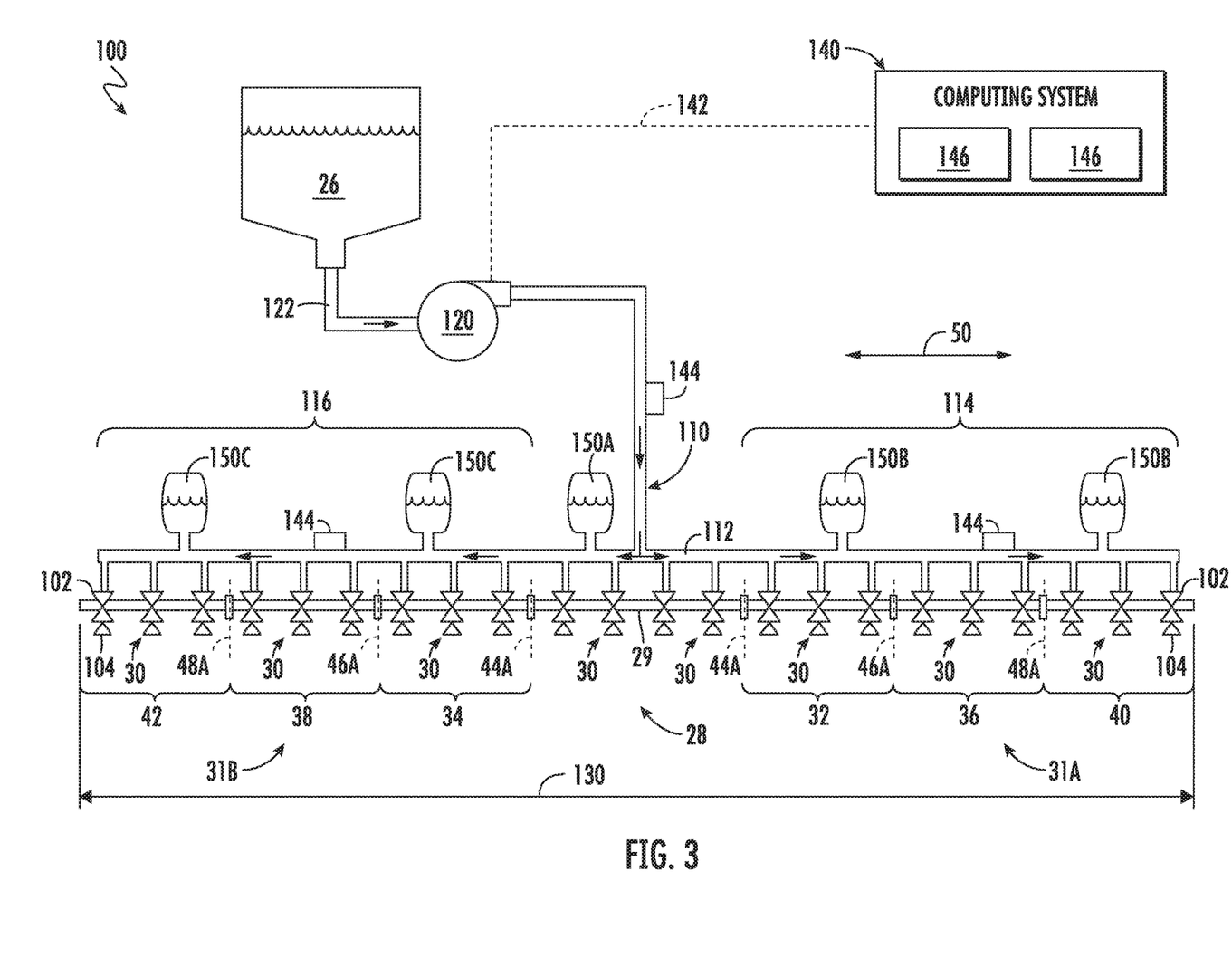
FIG. 3 illustrates a simplified, schematic view of one embodiment of a product application system in accordance with aspects of the present subject matter, particularly illustrating the system including a common rail product circuit and one or more pressure accumulators fluidly coupled thereto.

Referring now to FIG. 3, a simplified, schematic view of a product application system 100 is illustrated in accordance with aspects of the present subject matter. In general, the system 100 will be described herein in relation to the agricultural sprayer 10 described above with reference to FIGS. 1 and 2. However, it should be appreciated that the system 100 may be advantageously utilized to control the application of agricultural product in association with any other suitable agricultural applicator, including sprayers having any other suitable sprayer configuration.

In several embodiments, the system 100 may include various boom-related components of an associated agricultural applicator, such as one or more of the components of the boom assembly 28 described above. For instance, as shown in FIG. 3, the system 100 includes a central boom section 29 (shown schematically in FIG. 3) and first and second boom arms 31A, 31B configured to be cantilevered from the central boom section 29. As described above, each boom arm 31A, 31B may include a respective set of boom sections (e.g., an inner boom section 32, 34, a middle boom section 36, 38, and an outer boom section 40, 42, each of which is shown schematically in FIG. 3) pivotably coupled both to one another (e.g., at the intermediate and outer pivot axes 46A, 48A) and the central boom section (e.g., at the inner pivot axes 44A) to allow the boom arms 31A, 31B to be moved or pivoted between their respective operational and transport positions.

Figure 4:
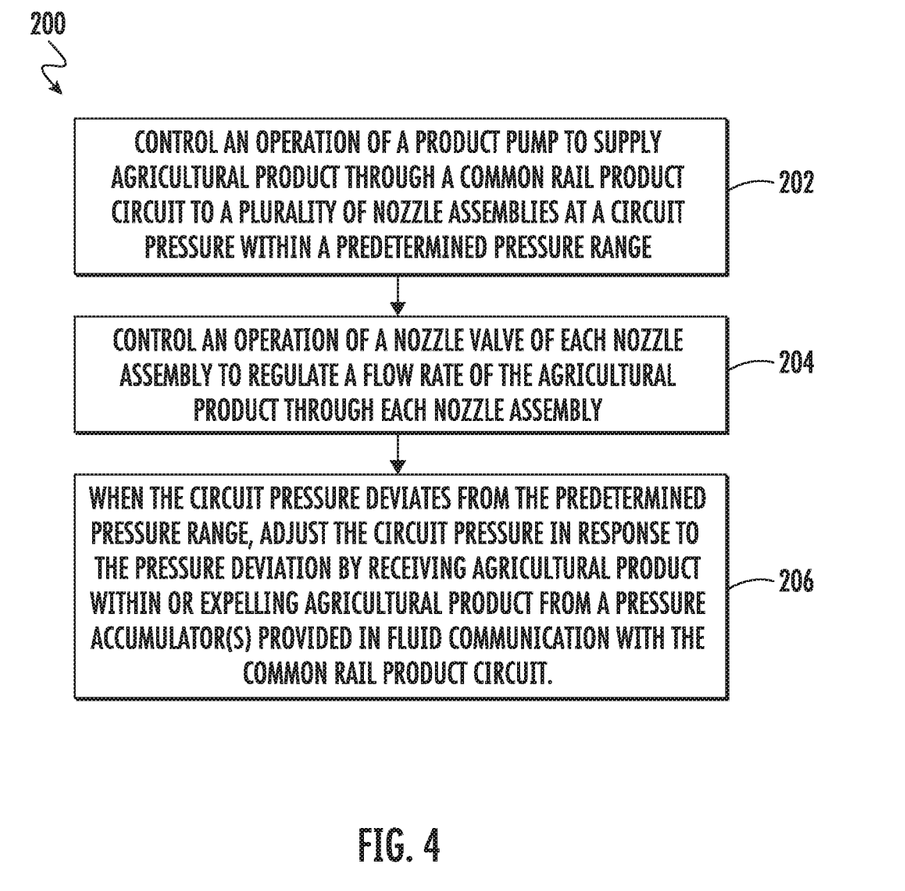
FIG. 4 illustrates a flow diagram of one embodiment of a method for operating an agricultural applicator in accordance with aspects of the present subject matter.

Additionally, as shown in FIG. 3, the system 100 includes a plurality of nozzle assemblies 30 coupled to otherwise supported relative to each boom section 29, 32, 34, 36, 38, 40, 42, with the various nozzle assemblies 30 being spaced apart from one another across the respective boom section in the lateral direction 50 of the sprayer 10. In general, each nozzle assembly 30 is configured to dispense an agricultural product stored within an associated tank (e.g., product tank 26) onto the underlying field and/or plants. In this regard, as indicated above, each nozzle assembly 30 may include a nozzle valve 102 (shown schematically in FIG. 3) and an associated spray tip or spray nozzle 104 (shown schematically in FIG. 3). In several embodiments, the operation of each nozzle valve 102 may be individually controlled such that the valve 102 regulates the flow rate of the agricultural product through the associated nozzle assembly 30, and thus, the application rate of the agricultural product dispended from the respective spray nozzle 104. Such control of the operation of the nozzle valve 102 may also be used to achieve the desired spray characteristics for the output or spray fan expelled from the associated spray nozzle 104, such as a desired droplet size and/or spray pattern. For instance, the nozzle valve 102 may be configured to be pulsed between open/closed positions relative to an orifice (not shown) of the adjacent spray nozzle 104 at a given frequency and duty cycle (e.g., using a pulse width modulation (PWM) technique) to achieve the desired flow rate and spray characteristics for the respective nozzle assembly 30. It should be appreciated that, simply for purposes of illustration, the central boom section 29 is shown in FIG. 3 as including four nozzle assemblies 30, while the boom sections 32, 34, 36, 38, 40, 42 of the first and second boom arms 31A, 31B are shown in FIG. 4 as each including three nozzle assemblies 30. One of ordinary skill in the art will appreciate that each boom section may generally include any number of nozzle assemblies 30, including more than three or four nozzle assemblies or less than three or four nozzle assemblies.

Moreover, as shown in the illustrated embodiment, the system 100 includes a common rail product circuit 110 and a product pump 120 in fluid communication with both the product circuit 110 and the product tank 26 (e.g., via a supply line 122) to allow the agricultural product stored within the tank 26 to be pressurized and supplied through the product circuit 110 to each nozzle assembly 30. As used herein, the term "common rail product circuit" generally refers to a product circuit including suitable plumbing components, such as one or more tubes or conduits, that form a common rail or supply line to which each individual nozzle assembly 30 across the various boom sections 29, 32, 34, 36, 38, 40, 42 is fluidly coupled. In other words, in contrast to conventional product circuits in which the nozzle assemblies associated with each boom section are fluidly coupled in parallel to a respective boom section line and each respective boom section line is, in turn, fluidly coupled in parallel with the remaining boom section lines to a common pump supply line, each nozzle assembly 30 across the various boom sections 29, 32, 34, 36, 38, 40, 42 of the disclosed system 100 is individually and directly coupled to the common supply line formed by the common rail product circuit 110. As a result, by maintaining the pressure of the agricultural product within the common rail product circuit 110 at a circuit pressure within a desired pressure range, each and every nozzle assembly 30 along the boom assembly 28 may be exposed to the same or substantially the same fluid pressure given its direct connection to the common supply line.

In several embodiments, the common rail product circuit 110 is configured to span in the lateral direction 50 across all or substantially all of a lateral length 130 of the boom assembly 28 to allow each individual nozzle assembly 30 to be coupled directly thereto. For instance, as shown in FIG. 3, the common rail product circuit 110 includes a central circuit section 112 spanning across the central boom section 29 and first and second circuit sections 114, 116 spanning across the first and second boom arms 31A, 31B, respectively, with the central circuit section 112 and the first and second circuit sections 114m 116 collectively forming a continuous, common supply line for the nozzle assemblies 30. For instance, the various circuit sections 112, 114, 116 may be formed from a single continuous plumbing component (e.g., a single continuous hose or conduit). Alternatively, two or more plumbing components fluidly connected in series (e.g., two or more hoses or conduits connected in series) to form the common supply line. Regardless, each respectively nozzle assembly 30 may be directly tied into or fluidly coupled to the common rail product circuit 110 at a given location along the length of the boom assembly 28. For instance, each nozzle assembly 30 supported by or coupled to the central boom section 29 may be directly tied into or fluidly coupled to the central circuit section 112 of the common rail product circuit 110. Similarly, each nozzle assembly 30 supported by or coupled to the first boom arm 31A may be directly tied into or fluidly coupled to the first circuit section 114 of the common rail product circuit 110, while each nozzle assembly 30 supported by or coupled to the second boom arm 31B may be directly tied into or fluidly coupled to the second circuit section 116 of the common rail product circuit 110.

Referring still to FIG. 3, the system 100 may also include a computing system 140 communicatively coupled to one or more components of the agricultural sprayer 10 to allow the operation of such components to be electronically or automatically controlled by the computing system 140. For instance, the computing system 140 may be communicatively coupled to the pump 120 (e.g., via a communicative link 142) to control the operation thereof. Specifically, in several embodiments, the computing system 140 may be configured to regulate the pump operation such that agricultural product supplied from the product tank 26 is output from the pump 120 as a suitable pressure so as to maintain the circuit pressure within the common rail product circuit 110 within a desired or predetermined pressure range (e.g., an operator-selected or prescribed pressure range). For example, in one embodiment, the computing system 140 may be configured to receive pressure-related data from one or more pressure sensors 144 fluidly coupled or otherwise provided in fluid communication with the common rail product circuit 110. In such an embodiment, the computing system 140 may be configured to monitor the circuit pressure of the agricultural product within the common rail product circuit 110 based on the sensor feedback provided by the pressure sensors 144 (the communicative links between the sensors 144 and the computing system 140 being omitted to simplify the illustration) and subsequently control the operation of the product pump 120 to maintain the circuit pressure within the desired pressure range.

Additionally, the computing system 140 may also be configured to control the operation of each nozzle assembly 30. Specifically, in several embodiments, the computing system 140 may be communicatively coupled to each nozzle valve 102 (the communicative links between the nozzle valves 102 and the computing system 140 being omitted to simplify the illustration) to allow the operation of such nozzle valve 102 to be automatically or electronically controlled. For instance, similar to that described above, the computing system 140 may be configured to control the operation of each nozzle valve 102 to regulate the flow rate of the agricultural product through the associated nozzle assembly 30, such as by transmitting suitable PWM control signals to each nozzle valve 102 to cause such valve 102 to be pulsed at a given frequency and duty cycle to achieve the desired flow rate. In one embodiment, such individual nozzle control may be based on sensor feedback received by the computing system 140. For example, suitable flow rate sensors (not shown) may be provided in operative association with one or more of the nozzle assemblies 30 (including all of the nozzle assemblies 30) to allow the computing system 140 to monitor the flow rates through the nozzle assemblies 30 and control the respective nozzle valves 102 accordingly.

In general, the computing system 140 may comprise one or more processor-based devices, such as a given controller or computing device or any suitable combination of controllers or computing devices. Thus, in several embodiments, the computing system 140 may include one or more processor(s) 146, and associated memory device(s) 148 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 148 of the computing system 140 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 148 may generally be configured to store suitable computer-readable instructions that, when implemented by the processor(s) 146, configure the computing system 140 to perform various computer-implemented functions, such as one or more aspects of the methods and algorithms that will be described herein. In addition, the computing system 140 may also include various other suitable components, such as a communications circuit or module, one or more input/output channels, a data/control bus and/or the like.

It should be appreciated that the various functions of the computing system 140 may be performed by a single processor-based device or may be distributed across any number of processor-based devices, in which instance such devices may be considered to form part of the computing system 140. For instance, the functions of the computing system 140 may be distributed across multiple application-specific controllers, such as a pump controller, individual nozzle controllers, and/or the like.

As indicated above, the computing system 140 may be configured to control the operation of the product pump 120 to maintain the circuit pressure of the agricultural product supplied through the common rail product circuit 110 within a desired or predetermined pressure range, while also controlling the operation of the nozzle valves 102 in order to achieve the desired flow rate. Specifically, by maintaining the circuit pressure within the desired pressure range (and, thus, exposing each nozzle assembly 30 to a desired operating pressure), the nozzle valves 102 can be controlled to achieve the desired flow rate (e.g., by varying the duty cycle at which the valve 102 is pulsed), thereby allowing the nozzle assemblies 30 to produce the desired spray characteristics (e.g., the desired droplet size and/or spray pattern). In this regard, in instances in which the ground speed of the agricultural sprayer 10 is being increased or decreased (including rapid increases or decreases), the flow rate through the nozzle assemblies 30 will typically be varied in accordance with such speed changes to maintain the application rate and the desired spray characteristics. However, given the interdependent relationship between the flow rate through the nozzle assemblies 30 and the circuit pressure within the common rail product circuit 110, such variations in the flow rates can result in pressure fluctuations within the product circuit 110 that leads to the circuit pressure temporarily dropping below or increasing above the desired pressure range prior to the product pump 120 being able to properly respond to such pressure variations.

Thus, in accordance with aspects of the present subject matter, the disclosed system 100 may also include one or more pressure accumulators 150 provided in fluid communication with the common rail product circuit 110 to prevent such temporary pressure fluctuations, thereby maintaining the circuit pressure within the desired pressure range. Specifically, pressure accumulator(s) 150 may function to adjust the circuit pressure of the agricultural product within the common rail product circuit 110 in response to pressure variations that deviate from the desired pressure range. For instance, in one embodiment, the pressure accumulator(s) 150 may be configured to release pressurized agricultural product into the common rail product circuit 110 when the circuit pressure within the product circuit 110 decreases below the desired pressure range, such as a decrease to a circuit pressure below a minimum pressure threshold set for the desired pressure range. Similarly, the pressure accumulator(s) 150 may be configured to receive pressurized agricultural product from the common rail product circuit 110 for storage therein when the circuit pressure within the product circuit 110 increases above the desired pressure range, such as an increase to a circuit pressure above a maximum pressure threshold set the desired pressure range. As a result, the pressure accumulator(s) 150 may assist in maintaining a constant or generally constant pressure within the common rail product circuit 110 during variations in the operational parameters of the system 100 due to ground speed changes or otherwise, thereby leading to improved spray quality.

It should be appreciated that, in several embodiments, any suitable number of pressure accumulators 150 may be fluidly coupled to the common rail product circuit 110. For instance, in one embodiment, a single pressure accumulator 150 may be provided in fluid communication with the common rail product circuit 110 to assist in minimizing or preventing pressure fluctuations within the product circuit 110. Alternatively, two or more pressure accumulators 150 may be fluidly coupled to the common rail product circuit 110. For instance, as shown in FIG. 3, a plurality of pressure accumulators 150 may be fluidly coupled to the common rail product circuit 110. In such an embodiment, it may be desirable to space the pressure accumulators 150 apart along the length 130 of the boom assembly 28 (and, thus, along the length of the common rail product circuit 110) to allow the pressure accumulators 150 to respond to local pressure fluctuations within the product circuit 110. For example, in the illustrated embodiment, the system 110 includes a central pressure accumulator 150A fluidly coupled to the central circuit section 112 of the common rail product circuit 110 and first and second pairs of side pressure accumulators 150B, 150C fluidly coupled to the first and second circuit sections 114, 116 of the common rail product circuit 110, respectively. However, in other embodiments, any other suitable number or arrangement of pressure accumulators 150 may be used in connection with the common rail product circuit 110.

It should also be appreciated that each pressure accumulator 150 may generally have any suitable configuration and/or may correspond to any suitable accumulator type or style that allows the accumulator 150 to function as described herein. For instance, in one embodiment, each pressure accumulator 150 may correspond to a hydro-pneumatic piston accumulator. In another embodiment, each pressure accumulator 150 may correspond to a diaphragmtype (or bladder-type) accumulator. In further embodiments, each pressure accumulator 150 may correspond to any other suitable accumulator type, such as a spring-type accumulator or a weight-loaded piston-type accumulator.

Depending on the accumulator type utilized within the system 110, the pressure accumulator(s) may be configured (and/or actively adjusted) to have or exhibit charge and discharge pressures associated with the desired pressure range for the common rail product circuit 110. For instance, in one embodiment, the discharge pressure for the pressure accumulator(s) 150 may be selected to correspond to a pressure equal to or slightly below the minimum pressure threshold set for the desired pressure range, thereby allowing the pressure accumulator(s) 150 to discharge pressurized agricultural product into the common rail product circuit 110 as the circuit pressure reaches or falls below the minimum pressure threshold. Similarly, the charge pressure for the pressure accumulator(s) 150 may be selected to correspond to a pressure equal to or slightly above the maximum pressure threshold set for the desired pressure range, thereby allowing the pressure accumulator(s) 150 to receive pressurized agricultural product from the common rail product circuit 110 for storage therein as the circuit pressure reaches or exceeds the maximum pressure threshold.

Additionally, in one embodiment, each pressure accumulator 150 may be configured to be charged with the agricultural product to be supplied within the common rail product circuit 110 as the boom assembly 28 is being initially primed with such agricultural product. For instance, as is generally understood, a boom assembly will typically be primed with agricultural product prior to initiation of a spraying operation to remove all gases from the product circuit and to ensure that agricultural product is distributed throughout the circuit and, thus, is ready for spraying via the nozzle assemblies. Accordingly, in one embodiment, to charge the pressure accumulator(s) 150, the operation of the product pump 120 may be controlled during the priming process such that the agricultural product is pumped through the product circuit 110 at a pressure that exceeds the charge pressure of the pressure accumulator(s) 150 (e.g., a pressure equal to or slightly above the maximum pressure threshold set for the desired pressure range), thereby allowing the pressure accumulator(s) 150 to store the agricultural product therein. Thereafter, following the priming process, the pump operation may be adjusted to reduce the circuit pressure back down to a pressure within the desired pressure range to allow for the spraying operation to be performed. Such a charging methodology allows for the pressure accumulator(s) 150 to be charged with whatever agricultural product is to be sprayed during the current spraying operation.

Referring now to FIG. 4, a flow diagram of one embodiment of a method 200 for operating an agricultural applicator is illustrated in accordance with aspects of the present subject matter. In general, the method 200 will be described herein with reference to the agricultural sprayer 10 shown in FIGS. 1 and 2, as well as the various system components shown in FIG. 3. However, it should be appreciated that the disclosed method 200 may be implemented with agricultural applicators having any other suitable configuration and/or within systems having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 includes controlling an operation of a product pump to supply agricultural product through a common rail product circuit to a plurality of nozzle assemblies at a circuit pressure within a predetermined pressure range. For instance, as indicated above, a computing system 140 may be configured to automatically or electronically control the operation of the product pump 120 to supply agricultural product through the common rail product circuit 110 to each of the nozzle assemblies 30 fluidly coupled thereto.

Additionally, at (204), the method 200 includes controlling an operation of a nozzle valve of each nozzle assembly to regulate a flow rate of the agricultural product through each nozzle assembly. For instance, as indicated above, the computing system 140 may be configured to automatically or electronically control the operation of each nozzle valve 102 to achieve a desired flow rate through each associated nozzle assembly 30, such as by pulsing each nozzle valve 102 at a given frequency and duty cycle to achieve the desired flow rate.

Moreover, at (206), when the circuit pressure of the agricultural product within common rail product circuit deviates from the predetermined pressure range, the method 200 includes adjusting the circuit pressure in response to the pressure deviation by receiving agricultural product within or expelling agricultural product from a pressure accumulator(s) provided in fluid communication with the common rail product circuit. For instance, as indicated above, one or more pressure accumulators 150 may be provided in fluid communication with the common rail product circuit 101 to prevent or minimize temporary pressure fluctuations or deviations, thereby maintaining the circuit pressure within the desired pressure range. Specifically, in one embodiment, the pressure accumulator(s) 150 may be configured to release pressurized agricultural product into the common rail product circuit 110 when the circuit pressure within the product circuit 110 decreases below the desired pressure range. Similarly, the pressure accumulator(s) 150 may be configured to receive pressurized agricultural product from the common rail product circuit 110 for storage therein when the circuit pressure within the product circuit 110 increases above the desired pressure range.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A product application system for an agricultural applicator, the system comprising:
    a boom assembly including a plurality of boom sections, each of the plurality of boom sections being pivotably coupled to at least one adjacent boom section of the plurality of boom sections;
    a common rail product circuit spanning across a length of the boom assembly;
    a product pump configured to supply an agricultural product through the common rail product circuit;

a plurality of nozzle assemblies provided in association with each of the plurality of boom sections, each nozzle assembly across the plurality of boom sections being individually coupled to the common rail product circuit;

a computing system communicatively coupled to the product pump, the computing system being configured to control an operation of the product pump in an attempt to maintain the circuit pressure of the agricultural product supplied through the common rail product circuit within a predetermined pressure range; and at least one pressure accumulator provided in fluid communication with the common rail product circuit, the at least one pressure accumulator being configured to adjust a circuit pressure of the agricultural product within the common rail product circuit in response to pressure deviations from the predetermined pressure range.

2. The system of claim 1, wherein the at least one pressure accumulator is configured to release agricultural product into the common rail product circuit in response to a decrease in the circuit pressure below the predetermined pressure range.

3. The system of claim 2, wherein the at least one pressure accumulator is further configured to receive agricultural product from the common rail product circuit in response to an increase in the circuit pressure above the predetermined pressure range.

4. The system of claim 1, wherein:
the boom assembly comprises a central boom section and first and second boom arms pivotably coupled to the central boom section;
the first boom arm includes a first set of boom sections of the plurality of boom sections and the second boom arm includes a second set of boom sections of the plurality of boom sections; and
the common rail product circuit includes a central circuit section extending across the central boom section, a first circuit section extending across at least a portion of the first boom arm, and a second circuit section extending across at least a portion of the second boom arm.

5. The system of claim 4, wherein the at least one pressure accumulator comprises a central pressure accumulator provided in fluid communication with the central circuit section of the common rail product circuit.

6. The system of claim 4, wherein the at least one pressure accumulator comprises at least one first pressure accumulator provided in fluid communication with the first circuit section of the common rail product circuit and at least one second pressure accumulator provided in fluid communication with the second circuit section of the common rail product circuit.

7. The system of claim 1, wherein at least one of a charge pressure or a discharge pressure of the at least one pressure accumulator is selected based on a respective maximum pressure threshold or a minimum pressure threshold set for the predetermined pressure range.

8. The system of claim 1, further comprising at least one pressure sensor fluidly coupled to the common rail product circuit, the computing system being configured to control the operation of the product pump based at least in part on feedback provided by the at least one pressure sensor.

9. The system of claim 1, wherein:
the computing system is communicatively coupled to a nozzle valve of each of the plurality of nozzle assemblies; and the computing system is configured to control an operation of each nozzle valve to regulate a flow rate of the agricultural product through the respective nozzle assembly.

10. The system of claim 9, wherein the computing system is configured to vary the operation of each nozzle valve in response to changes in a ground speed of the agricultural applicator to adjust the flow rate of the agricultural product through the respective nozzle assembly.

11. The system of claim 10, wherein the at least one pressure accumulator is configured to adjust the circuit pressure of the agricultural product within the common rail product circuit in response to pressure variations deriving from the adjusted flow rates through the plurality of nozzle assemblies.

12. A method for operating an agricultural applicator, the agricultural applicator comprising a boom assembly including a plurality of boom sections and a common rail product circuit spanning across a length of the boom assembly, the agricultural applicator further comprising a plurality of nozzle assemblies provided in association with each of the plurality of boom sections, each nozzle assembly across the plurality of boom sections being individually coupled to the common rail product circuit, the method comprising:
receiving pressure data associated with a circuit pressure of agricultural product within the common rail product circuit;
controlling an operation of a product pump based at least in part on the received pressure data to supply agricultural product through the common rail product circuit to the plurality of nozzle assemblies at a pressure within a predetermined pressure range;
controlling an operation of a nozzle valve of each nozzle assembly of the plurality of nozzle assemblies to regulate a flow rate of the agricultural product through each nozzle assembly; and
when the circuit pressure of the agricultural product within common rail product circuit deviates from the predetermined pressure range, adjusting the circuit pressure in response to the pressure deviation by receiving agricultural product within or expelling agricultural product from at least one pressure accumulator provided in fluid communication with the common rail product circuit.

13. The method of claim 12, wherein adjusting the circuit pressure in response to the pressure deviation comprises supplying agricultural product from the at least one pressure accumulator to the common rail product circuit when the circuit pressure decreases below the predetermined pressure range.

14. The method of claim 12, wherein adjusting the circuit pressure in response to the pressure deviation comprises receiving agricultural product from the common rail product circuit for storage within the at least one pressure accumulator when the circuit pressure increases above the predetermined pressure range.

15. The method of claim 12, further controlling the operation of the product pump to increase the circuit pressure within the common rail product circuit above the predetermined pressure range to charge the at least one pressure accumulator with the agricultural product.

16. The method of claim 12, wherein controlling the operation of the nozzle valve of each nozzle assembly comprises controlling the operation of the nozzle valve of each nozzle assembly in response to changes in a ground speed of the agricultural applicator to adjust the flow rate of the agricultural product through each nozzle assembly.

17. The method of claim 16, wherein adjusting the circuit pressure in response to the pressure deviation comprises adjusting the circuit pressure in response to a pressure variation deriving from the adjusted flow rate through each nozzle assembly by receiving agricultural product within or expelling agricultural product from the at least one pressure accumulator.

18. The method of claim 12, wherein:
the boom assembly comprises a central boom section and first and second boom arms pivotably coupled to the central boom section;
the first boom arm includes a first set of boom sections of the plurality of boom sections and the second boom arm includes a second set of boom sections of the plurality of boom sections;
the common rail product circuit includes a central circuit section extending across the central boom section, a first circuit section extending across at least a portion of the first boom arm, and a second circuit section extending across at least a portion of the second boom arm; and
adjusting the circuit pressure in response to the pressure deviation comprises adjusting the circuit pressure in response to the pressure deviation by receiving agricultural product within or expelling agricultural product from at least one pressure accumulator provided in fluid communication with one of the central circuit section, the first circuit section, or the second circuit section.

19. A product application system for an agricultural applicator, the system comprising:
a boom assembly including a central boom section and first and second boom arms pivotably coupled to the central boom section, the first boom arm including a first set of boom sections of a plurality of boom sections of the boom assembly and the second boom arm includes a second set of boom sections of the plurality of boom sections; and
a common rail product circuit spanning across a length of the boom assembly, the common rail product circuit including a central circuit section extending across the central boom section, a first circuit section extending across at least a portion of the first boom arm, and a second circuit section extending across at least a portion of the second boom arm;
a product pump configured to supply an agricultural product through the common rail product circuit;
a plurality of nozzle assemblies provided in association with each of the plurality of boom sections, each nozzle assembly across the plurality of boom sections being individually coupled to the common rail product circuit; and
at least one pressure accumulator provided in fluid communication with the common rail product circuit, the at least one pressure accumulator being configured to adjust a circuit pressure of the agricultural product within the common rail product circuit in response to pressure deviations from a predetermined pressure range,
wherein the at least one pressure accumulator comprises at least one first pressure accumulator provided in fluid communication with the first circuit section of the common rail product circuit and at least one second pressure accumulator provided in fluid communication with the second circuit section of the common rail product circuit.

20. The system of claim 19, wherein at least one of a charge pressure or a discharge pressure of the at least one pressure accumulator is selected based on a respective maximum pressure threshold or a minimum pressure threshold set for the predetermined pressure range.

* * * * *